(No Model.) 3 Sheets—Sheet 1.

E. W. HOWELL.
STOP COCK OR TURNING PLUG.

No. 494,569. Patented Apr. 4, 1893.

WITNESSES:
William Goebel.
C. L. Davis

INVENTOR
Edward W. Howell
BY
E. M. Marble
ATTORNEY.

(No Model.) 3 Sheets—Sheet 2.
E. W. HOWELL.
STOP COCK OR TURNING PLUG.
No. 494,569. Patented Apr. 4, 1893.
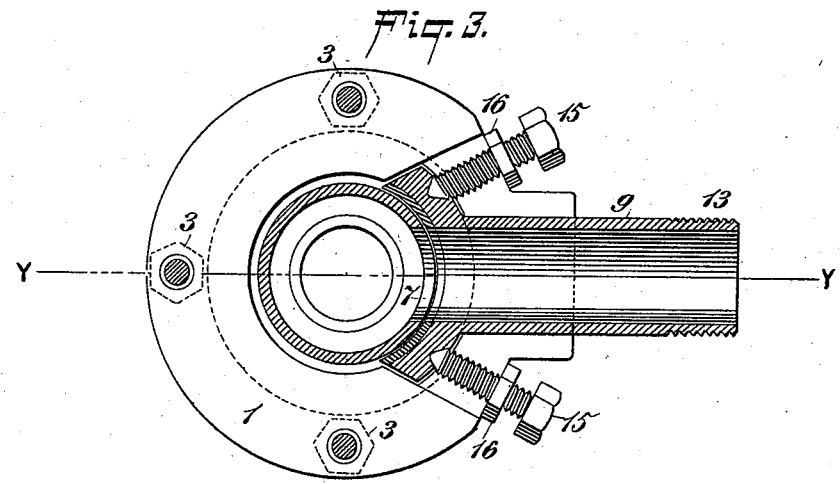
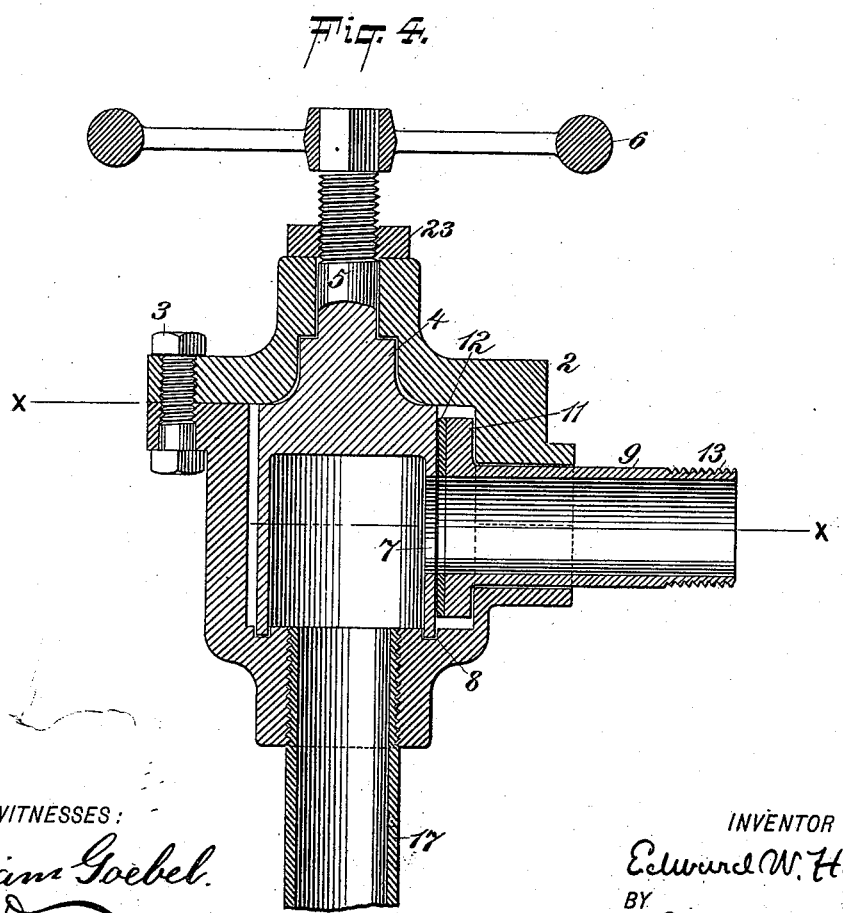
WITNESSES:
William Goebel.
C. L. Davis
INVENTOR
Edward W. Howell
BY
E. M. Marble
ATTORNEY.

(No Model.) 3 Sheets—Sheet 3.
E. W. HOWELL.
STOP COCK OR TURNING PLUG.
No. 494,569. Patented Apr. 4, 1893.
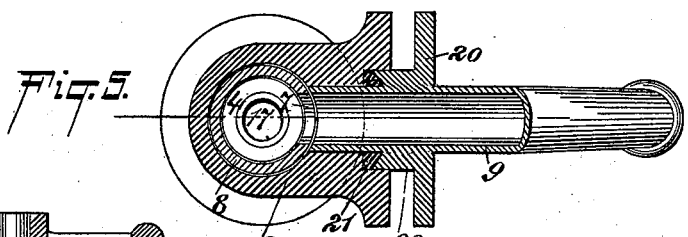
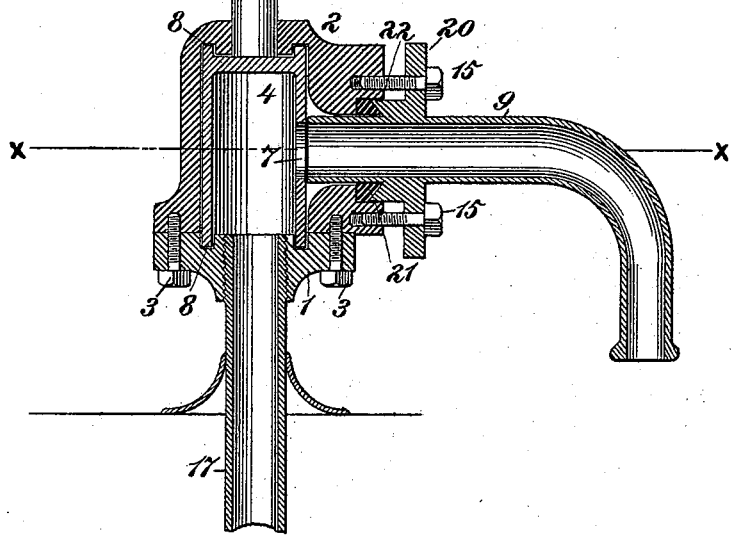
WITNESSES:
William Goebel.
C. L. Davis
INVENTOR
Edward W. Howell
BY
E. M. Marble
ATTORNEY.

UNITED STATES PATENT OFFICE.

EDWARD W. HOWELL, OF NEW YORK, N. Y.

STOP-COCK OR TURNING PLUG.

SPECIFICATION forming part of Letters Patent No. 494,569, dated April 4, 1893.

Application filed January 20, 1892. Serial No. 418,666. (No model.)

*To all whom it may concern:*

Be it known that I, EDWARD W. HOWELL, a citizen of the United States, residing in the city and county of New York, in the State of New York, have invented certain new and useful Improvements in Stop-Cocks or Turning Plugs, of which the following is a specification, such as will enable others skilled in the art to which it appertains to make and use the same.

The object of my invention is to provide a stop-cock or turning-plug, for use in water distributing, or other pipes, which may be turned fully on or off by a slight turn of the operating wheel or handle, and in which the wear upon the plug and plug-seat may be easily taken up at any time, without taking the device apart, or disconnecting the same from the pipes. All this is accomplished by the device shown and described in the following specification, of which the accompanying drawings form a part, wherein similar numerals of reference designate like or equivalent parts wherever found throughout the several views, and in which:—

Figure 1:
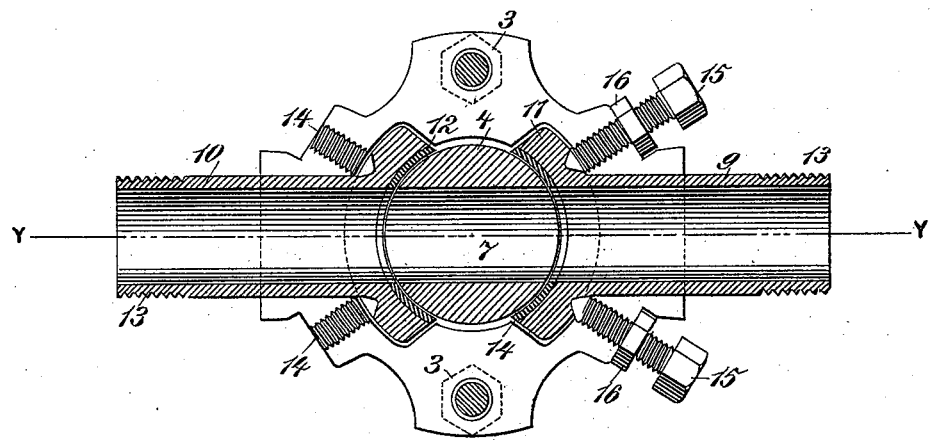
Figure 2:
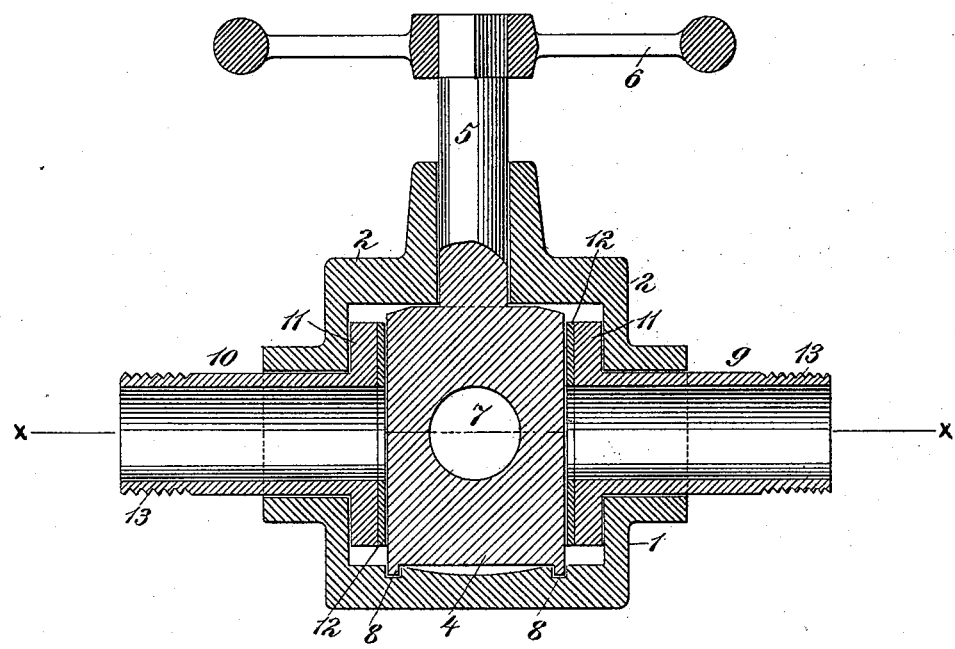

Figure 1, is a view of my improved stop-cock or turning-plug, in central horizontal section on the line $x$—$x$ of Fig. 2, and Fig. 2, a view thereof in central vertical section, on the line $y$—$y$ of Fig. 1. Figs. 3, and 4, are like views of a modified form of construction thereof, showing the invention as applied to angle plugs or cocks, and Figs. 5 and 6, are like views of a slightly modified form of the construction shown in Figs. 3 and 4.

The device will be first described as shown in Figs. 1 and 2, together with the manner of operating the same, after which the construction of the various modifications shown, will be fully set forth in appropriate order.

Referring to the drawings:—the numeral 1, designates the bottom, and 2, the top portion, of the plug casing, which is divided into two parts as shown, preferably on the line $x$—$x$ of Fig. 2. These top and bottom pieces 1 and 2, of such casing, when in position, are held firmly in place by screw-bolts and nuts 3, passing through flanges formed thereon for that purpose, or in any other desired manner. Within the casing so formed by these two pieces 1 and 2, is revolubly mounted a cylindrical plug 4, provided with an actuating stem 5, formed integral therewith or firmly secured thereto, which passes up through a hole formed for that purpose in the top piece 2, of the casing, and this stem 5, has rigidly secured to its top a hand-wheel 6, or other convenient device, by which the same may be rotated. Passing through the plug 4, substantially at right angles to the axis thereof, is a hole or passage 7, through which, the water or other liquid flows, when the plug is open, and in the position shown in Fig. 1.

The plug or cylinder 4, may if desired, in order to secure lightness, be made hollow, and the same is preferably provided on its bottom with a downwardly extending circular flange 8, which fits into a corresponding circular slot or depression in the bottom of the casing, said slot and flange together forming a bearing for the bottom end of the plug when the same is rotated. If desired such plug 4, may also be provided with a corresponding flange fitting into a like slot, at the top, as shown in Fig. 6, or a bearing may be formed for the top and bottom thereof in any other manner desired, or such bearings may be altogether omitted.

Formed half in the bottom and half in the top portions 1 and 2, of the casing, one at each side thereof, are holes through which pass pipes 9 and 10, the inner ends of which abut upon the sides of the plug 4. These pipes are preferably provided upon their inner ends with flanged heads 11, preferably of the shape shown, so concaved upon their inner surfaces as to fit tightly against the rounded side of the plug 4, at all points of such surface, when pressed against the same; and in order to form a more perfect joint between said heads 11, and the plug 4, said heads may if desired be faced with Babbitt metal or other suitable substance, as shown at 12. These pipes 9, and 10, are the inlet and outlet to the plug or cock, and are preferably screw-threaded at their outer ends as shown at 13, in order to facilitate attachment to other pipes as desired. On each side of these pipes 9 and 10, and like the holes through which said pipes pass, preferably formed half in the upper and half in the lower portion of the casing, are screw-threaded holes 14, adapted to receive screwbolts 15, the inner ends of which when the same are screwed home, press against the rear of the flaring heads 11, of the pipes 9 and 10, in such manner as to force and hold the same firmly against the side of the plug 4, whereby a tight joint is made between the sides of said plug 4, and ends of the pipes 9 and 10; and in order to prevent these bolts 15, from shaking loose, they are preferably provided with binding or jam-nuts 16, by which any retroactive movement thereof is prevented.

To take the device apart, the screw-bolts 15, are loosened, the wheel 6, removed, the bolts 3, unscrewed, and the top portion 2, of the casing removed, when the plug 4, and pipes 9, and 10, may be lifted out; and the same may be put together again by a reversal of the process described.

The operation of this improved stop-cock or turning-plug is extremely simple:—The same being closed, and the plug 4, being in the position shown in Fig. 2, by simply giving the hand-wheel 6, a one-quarter turn in either direction, the same will be opened by said plug 4, being brought into the position shown in Fig. 1, whereby a straight passage of the same diameter as the pipes 9 and 10, will be formed for the liquid flowing through the same, by the passage 7, through said plug 4, and by another quarter turn of said hand-wheel 6, in either direction, said plug may be again closed by being again brought into the position shown in Fig. 2.

Should the plug be at any time found to be leaking, a turn or two of the screw-bolts 15, will at once put a stop thereto, by forcing the heads 11, of the pipes 9, and 10, which really constitute the seat for the plug 4, more tightly against the same.

In the modified form of construction shown in Figs. 3 and 4, the plug 4, is made in the form of a hollow cylinder closed at the top, as shown, and the passage 7, is formed through one wall only of such cylinder. In this form of the device, the liquid enters through the pipe 9, and making a turn at right angles within the plug 4, after entering the same by way of the passage 7, passes therefrom at the bottom, through a pipe 17, in communication therewith as shown; or, if desired the liquid may enter through the pipe 17, and pass out through the pipe 9. In this case the pipe 10, is of course omitted, the pipe 17, taking the place thereof, and the head 11, of the pipe 9, is held firmly seated against the side of the plug 4, by means of the bolts 15, in the same manner as in Figs. 1, and 2.

In the modified form of construction shown in Figs. 5, and 6, the bottom portion 1, of the casing is simply a plate, through which passes the pipe 17, while the hole through which passes the pipe 9, is formed wholly in the top portion 2, of such casing, as shown. In this form the flanged head 11, is omitted from said pipe 9, and the inner end thereof is simply concaved as shown at 19, in Fig. 5, so as to fit snugly against the rounded side of the plug 4. Firmly secured to the pipe 9, on the outside of the casing, is a circular flange 20, through which pass the bolts 15, having screw-threads working in holes formed in the casing as shown, by which the inner end of said pipe 9, is kept firmly pressed against the side of the plug 4. A packing 21, may if desired be placed in a groove made for that purpose in the casing 2, so as to surround the hole through which passes the pipe 9, and the flange 20, may have an inwardly projecting collar 22, formed thereon, by which this packing is compressed so as to form a tight joint between the pipe 9, and casing, as the pipe 9, is forced inward by the action of the screws 15, on the collar 20.

As a further precaution against leakage, the stem 5, may be screw-threaded as shown in Fig. 4, and provided with a binding or jam-nut 23, by which the plug 4 may be at all times pressed against the top of the casing, and in the right angled form of plug shown in Fig. 6, the plug 4 may be made of such length that a tight joint will be formed between the bottom of the same, and the bottom portion of the casing, when the same is screwed fully into position by means of the screws 3.

The operation of the modified forms of construction, and the manner of taking apart and putting together the same, are substantially similar as in the form of device shown in Figs. 1 and 2, and hereinbefore more particularly described.

It is evident that many modifications in the construction, combination and arrangement of the various parts of my improved stop-cock and turning plug, other than those mentioned herein, may be made without departing from the scope of my invention, and I do not limit myself to any particular form thereof; but Having particularly described my invention, its construction and operation, what I claim, and desire to secure by Letters Patent, is—

1. A stop-cock or turn-plug, having a cylindrical plug provided with a passage therethrough revolubly mounted within a casing, inlet and outlet pipes passing through the casing wall, one of which abuts against the side of the cylindrical plug, means for forcing said pipe tightly against the side of said plug, and means for rotating said plug, substantially as shown and described.

2. A stop-cock or turn-plug, having a cylindrical plug provided with a passage therethrough revolubly mounted within a casing, inlet and outlet pipes passing through the casing wall, one of which abuts against the side of said plug, said pipe being provided with a flanged head made to fit the plug, means for forcing said flanged head against the plug, and means for rotating the plug, substantially as described.

3. A stop-cock or turn-plug, having a cylindrical plug provided with a passage therethrough revolubly mounted within a casing, inlet and outlet pipes passing through the casing wall, one of which abuts against the side of said plug, said pipe being provided with a flanged head made to fit the plug, screws as 15 for forcing said flanged head against the cylindrical plug, and means for rotating said plug, substantially as described.

4. A stop-cock or turn-plug consisting of a cylindrical plug with a passage therethrough revolubly mounted within a casing, inlet and outlet pipes passing through the casing wall, one of which abuts against the side of said plug, means for preventing lateral movement of said plug, and means for rotating said plug, substantially as described.

5. A stop-cock or turn-plug consisting of a cylindrical plug provided with a passage therethrough revolubly mounted within a casing, inlet and outlet pipes passing through the casing wall, and one of which abuts against the side of said plug, means for forcing said pipe tightly against said plug, means for preventing lateral movement of said plug, and means for rotating said plug, substantially as described.

6. A stop-cock or turn-plug, consisting of a cylindrical plug provided with a passage therethrough revolubly mounted within a casing, inlet and outlet pipes passing through the casing wall, one of which abuts against the side of said plug, a circular flange on the bottom surface of said plug fitting into a corresponding groove in the plug casing for preventing lateral movement of said plug, and means for rotating said plug, substantially as described.

Signed at the city and county of New York, in the State of New York, this 6th day of January, A. D. 1892.

EDWARD W. HOWELL.

Witnesses:
GEO. E. HORNE,
CLARENCE L. DAVIS.